US011541332B2

(12) United States Patent
Zhang

(10) Patent No.: US 11,541,332 B2
(45) Date of Patent: Jan. 3, 2023

(54) APPARATUS FOR SEPARATING PARTICLES FROM A PARTICULATE SUSPENSION

(71) Applicant: Shujun Zhang, West Perth (AU)

(72) Inventor: Shujun Zhang, West Perth (AU)

( * ) Notice: Subject to any disclaimer, the term of this patent is extended or adjusted under 35 U.S.C. 154(b) by 211 days.

(21) Appl. No.: 16/921,131

(22) Filed: Jul. 6, 2020

(65) Prior Publication Data

US 2021/0331093 A1   Oct. 28, 2021

(30) Foreign Application Priority Data

Apr. 28, 2020   (AU) ............................... 2020901335

(51) Int. Cl.
| | |
|---|---|
| *B01D 21/26* | (2006.01) |
| *B01D 21/24* | (2006.01) |
| *B03B 5/52* | (2006.01) |
| *B03B 5/62* | (2006.01) |

(52) U.S. Cl.
CPC ........ *B01D 21/265* (2013.01); *B01D 21/2411* (2013.01); *B03B 5/52* (2013.01); *B03B 5/626* (2013.01)

(58) Field of Classification Search
CPC .......... B01D 21/265; B03B 5/52; B03B 5/626
See application file for complete search history.

(56) References Cited

U.S. PATENT DOCUMENTS

| | | | |
|---|---|---|---|
| 2,214,905 A * | 9/1940 | Kidwell | ................... B07B 7/08 209/143 |
| 4,324,334 A | 4/1982 | Wright et al. | |
| 4,563,279 A | 1/1986 | Wright | |

FOREIGN PATENT DOCUMENTS

| | | | | |
|---|---|---|---|---|
| CN | 107670838 A | | 2/2018 | |
| FR | 2918900 A1 | * | 1/2009 | ......... B01D 21/0039 |
| RU | 2169047 C2 | | 6/2001 | |

OTHER PUBLICATIONS

International-type search report for Australian Provisional Patent Application 2020901335.

* cited by examiner

*Primary Examiner* — David C Mellon
(74) *Attorney, Agent, or Firm* — Carrier Blackman & Associates, P.C.; Joseph P. Carrier; Fulchand P. Shende

(57) ABSTRACT

An apparatus for separating particles from a particulate suspension comprises a conduit comprising a plurality of elongate channels extending in adjacent alignment along a spiral path at different curvature radii from an axis of the spiral path. Longitudinal sidewalls of the elongate channels are fluidly joined together to allow for transfer of fluid between them. The apparatus also comprises an inlet for directing a particulate suspension into the conduit and outlets that direct fluid from the particulate suspension out from different discharge positions. At least first and second of the elongate channels are approximately circular in cross section and comprise a shared longitudinal sidewall, wherein the shared longitudinal sidewall comprises opposed uppermost and lowermost sidewall sections that are laterally offset from one another relative to the axis of the spiral path to allow for transfer of helically flowing fluid between the first and second of the elongate channels.

15 Claims, 4 Drawing Sheets

APPARATUS FOR SEPARATING PARTICLES FROM A PARTICULATE SUSPENSION

CROSS-REFERENCE TO RELATED APPLICATIONS

The present application claims priority under 35 USC 119 based on Australian Provisional Patent Application No. 2020901335, filed on Apr. 28, 2020. The entire subject matter of this priority document, including specification claims and drawings thereof, is incorporated by reference herein.

FIELD

The present invention relates to mineral processing and, more particularly, to an apparatus and method for separating particles from particulate suspensions.

BACKGROUND

A cyclone is a commonly used device for separating and removing particulate materials suspended in slurries and other liquid suspensions. A traditional cyclone comprises a vertically oriented cylindrical or conical vessel that has an inlet at its upper end for introducing a liquid suspension under pressure into the vessel in a tangential manner. A pair of circular outlets are provided at, respectively, the uppermost and lowermost ends of the vessel. A vertical overflow pipe extends axially from the uppermost circular outlet down to a centre of the vessel.

Fluid flowing into the inlet creates a high velocity spinning double vortex in the vessel that consists of an outer stream and an inner stream. The outer stream flows in a wide spiral motion downwardly towards the bottom of the vessel. The inner stream flows inside the outer stream in a tight spiral motion upwardly through the overflow pipe towards the uppermost outlet.

Particles suspended in the fluid flow initially into the outer stream. Larger (heavier) particles that have too much inertia to follow the spiral path of the outer stream strike the vessel's sidewall. These particles move progressively down the vessel until they exit via the lowermost circular outlet with the outer stream. Smaller (lighter) particles that experience smaller centrifugal forces insufficient to overcome the fluid's viscosity move towards the centre of the vessel. These particles eventually enter the inner stream and travel up the overflow pipe to exit via the uppermost circular outlet. The cyclone device, therefore, operates to separate the particles into two different classes based on their size and weight.

Traditional cyclones of this configuration are problematic. Some of the fluid in the outer stream often flows underneath the overflow pipe at the lowermost end of the pipe instead of spinning all the way to the bottom of the vessel. This phenomenon, which is sometimes referred to as short circuit flow, can result in course (heavy) particles from the outer stream entering the inner stream and exiting the vessel via the uppermost outlet. Short circuit flow, therefore, reduces the effectiveness of cyclone separators and their particle classification efficiency. The cyclone also only enables particles to be graded into two different classes (large and small).

In this context, there is a need for improved ways for separating particulate materials in particulate suspensions.

SUMMARY

According to the present invention, there is provided an apparatus for separating particles from a particulate suspension, comprising:

a conduit that comprises a plurality of elongate channels that extend in adjacent alignment along a spiral path at different curvature radii from an axis of the spiral path, wherein longitudinal sidewalls of the elongate channels are fluidly joined together to allow for transfer of fluid between the elongate channels;

an inlet for directing a particulate suspension into the conduit under pressure and along the spiral path; and a plurality of outlets configured to direct fluid from the particulate suspension out from a plurality of different discharge positions on the conduit, wherein at least first and second of the elongate channels are approximately circular in cross section and comprise a shared longitudinal sidewall, wherein the shared longitudinal sidewall comprises opposed uppermost and lowermost sidewall sections that are laterally offset from one another relative to the axis of the spiral path to allow for transfer of helically flowing fluid between the first and second of the elongate channels.

The first and second of the elongate channels may comprise uppermost and lowermost portions that are approximately semicircular in cross section, wherein a pair of ends of the uppermost portions are joined together to provide the uppermost of the sidewall sections and a pair of ends of the lowermost portions are joined together to provide the lowermost of the sidewall sections.

A third of the elongate channels may be approximately circular in cross section and comprise a longitudinal sidewall shared with the second of the elongate channels, wherein the longitudinal sidewall is configured such that fluid helically flowing from the second of the elongate channels into the third of the elongate channels flows in an opposite direction to fluid helically flowing from the first of the elongate channels into the second of the elongate channels.

The conduit may also comprise an innermost elongate channel, wherein a cross sectional shape of the innermost elongate channel comprises a curved end section that tapers towards an end region fluidly joined to the first of the elongate channels.

The cross sectional shape of the innermost elongate channel may also comprise an approximately circular section that is fluidly joined to the curved end section.

The inlet may direct the particulate suspension into the approximately circular section of the innermost elongate channel.

The outlets may be arranged such that the discharge positions are different distances away from the axis of the spiral path.

Each of the outlets may be configured to direct fluid from the particulate suspension out from a unique one of the elongate channels.

The outlets may comprise a plurality of apertures in the conduit proximal to terminal ends of the elongate channels.

The outlets may comprise a plurality of nozzles on the conduit proximal to terminal ends of the elongate channels.

The nozzles may be tapered.

The axis of the helical path may be generally vertically oriented and the outlets may be arranged such that the discharge positions are different perpendicular distances away from the axis of the helical path.

The conduit may be supported by a vertically orientated support member.

The conduit may extend around the axis of the spiral path by more than one complete rotation.

The apparatus may comprise a pump for pumping the particulate suspension into the inlet.

The present invention also provides a method for separating particles from a particulate suspension, the method comprising:

obtaining a conduit that comprises a plurality of elongate channels that extend in adjacent alignment along a spiral path at different curvature radii from an axis of the spiral path, wherein longitudinal sidewalls of the elongate channels are fluidly joined together to allow for transfer of fluid between the elongate channels;

directing a particulate suspension into an inlet of the conduit under pressure and along the spiral path; and directing fluid from the particulate suspension out from a plurality of different discharge positions on the conduit, wherein at least first and second of the elongate channels are approximately circular in cross section and comprise a shared longitudinal sidewall, wherein the shared longitudinal sidewall comprises opposed uppermost and lowermost sidewall sections that are laterally offset from one another relative to the axis of the spiral path to allow for transfer of helically flowing fluid between the first and second of the elongate channels.

BRIEF DESCRIPTION OF DRAWINGS

Embodiments of the invention will now be described by way of example only with reference to the accompanying drawings, in which.

DESCRIPTION OF EMBODIMENTS

Figure 1:
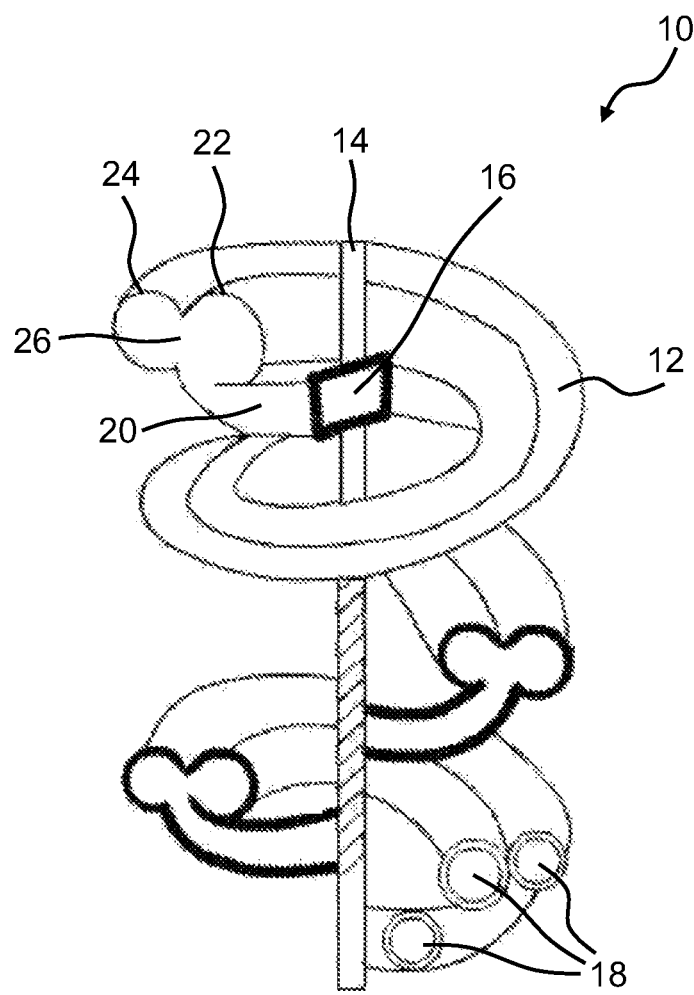
FIG. 1 is a side on perspective view of an apparatus for separating particles from a particulate suspension as known in the art.

Referring to FIG. 1, an apparatus 10 for separating particles from a particulate suspension as known in the art is shown. The apparatus 10 depicted is published in patent application publication number CN107670838A filed in China on 3 Nov. 2017. The apparatus 10 comprises a conduit 12 comprising three elongate channels 20, 22, 24 that extend in adjacent alignment along a spiral path at different curvature radii from an axis 14 of the spiral path. Longitudinal sidewalls of the channels 20, 22, 24 are fluidly joined together to allow for transfer of fluid between them. The apparatus 10 comprises an inlet 16 for directing a particulate suspension into the conduit 12. Three outlets 18 are provided at the terminal ends of the channels 20, 22, 24 at the bottom of the apparatus 10. The three outlets 18 correspond to three different respective classes of particles that may be separated and collected using the apparatus 10. The first channel 20 is approximately triangular in cross section. The second and third channels 22, 24 are approximately circular in cross section and are joined together such that fluid flowing through the second channel 22 may flow into the third channel 24 by passing through a shared boundary region 26 between the two channels 22, 24.

In use, a fluid suspension is directed into the inlet 16 using a pump. The fluid suspension enters the conduit 12 tangentially to the axis 14 and flows along the first channel 20 down towards the outlets 18. A centrifugal field is created that causes fluid and suspended particulates to be forced outwardly towards the second channel 22. Particulates that are too small in size and/or weight to overcome the viscosity of the fluid remain flowing in the first channel 20. Larger and/or heavier particulates are forced up into the second channel 22. Similarly, particulates that are too small in size and/or weight to overcome the viscosity of the fluid in the second channel 22 remain flowing in the second channel 22, whereas larger and/or heavier particulates are forced outwardly into the outermost channel 24 via the shared boundary region 26. By the time the fluid has flowed all the way to the lowermost end of the conduit 12, the suspended particulates are separated such that the three channels 20, 22, 24 contain, respectively, fine, medium and course particulates.

The apparatus 10 is simple in structure and the problematic short circuit flow that is encountered when using cyclone separators is eliminated. However, the apparatus 10 suffers from several shortfalls. In particular, the fluid flowing through the conduit 12 under pressure cannot transfer effectively from the first channel 20 outwardly to the third channel 24. The curvature of the conduit 12 inherently causes the fluid to flow in a helical motion though each of the channels 20, 22, 24. The fluid is, therefore, not able to move across the shared boundary region 26 between the second and third channels 22, 24 efficiently. The shared region 26 induces substantial turbulent fluid flow in the conduit 12 which stops large/heavy particulates from moving into the outermost channel 26. Further, the shape and configuration of the second and third channels 22, 24 is not scalable. If particles need to be graded into more than three classes, adding additional channels to the outmost edge of the conduit 12 adjacent the third channel 24 has no effect. Due to the turbulence and fluid friction encountered by the helically flowing fluid within the conduit 12, only a negligible quantity of particles is able to flow into the additional channels.

Figure 2:
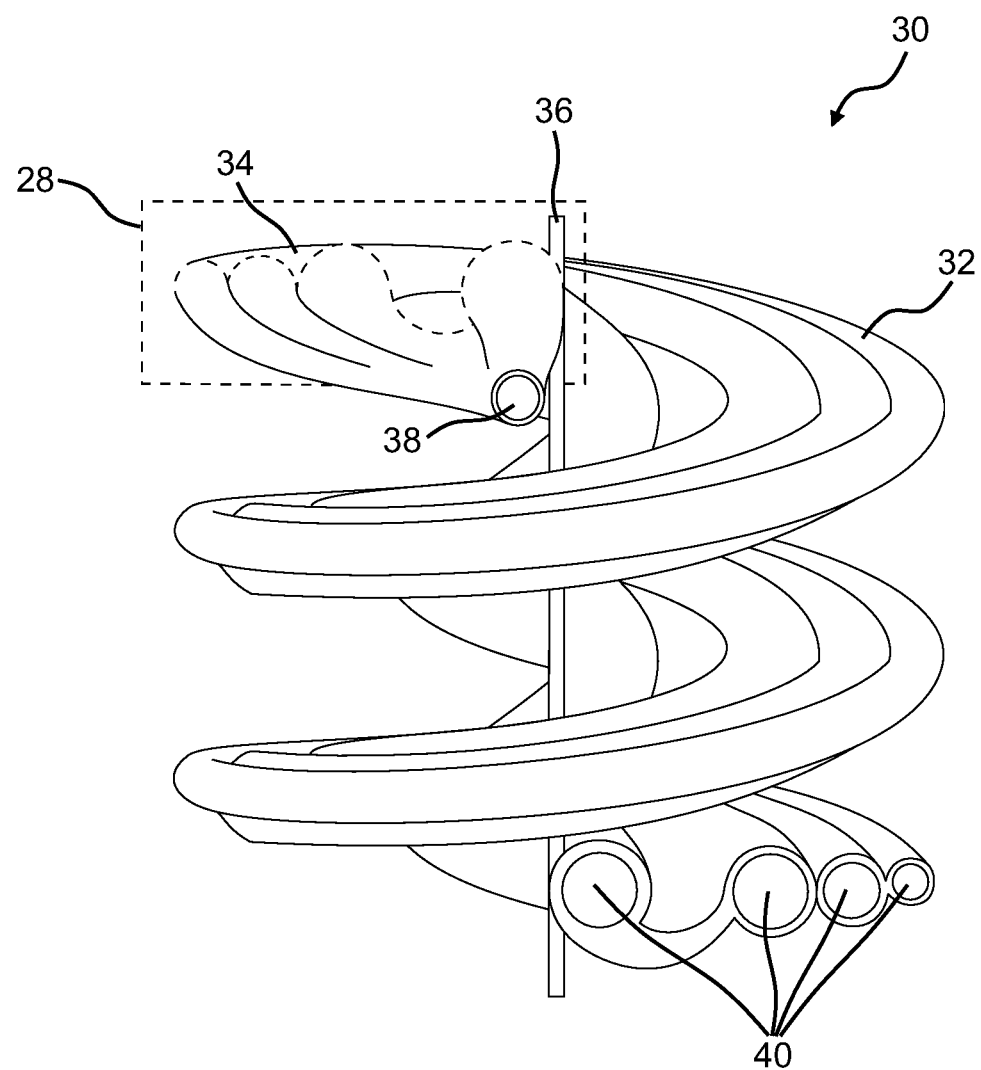
FIG. 2 is a side on perspective view of an improved apparatus for separating particles from a particulate suspension according to an example embodiment of the invention.
Figure 3:
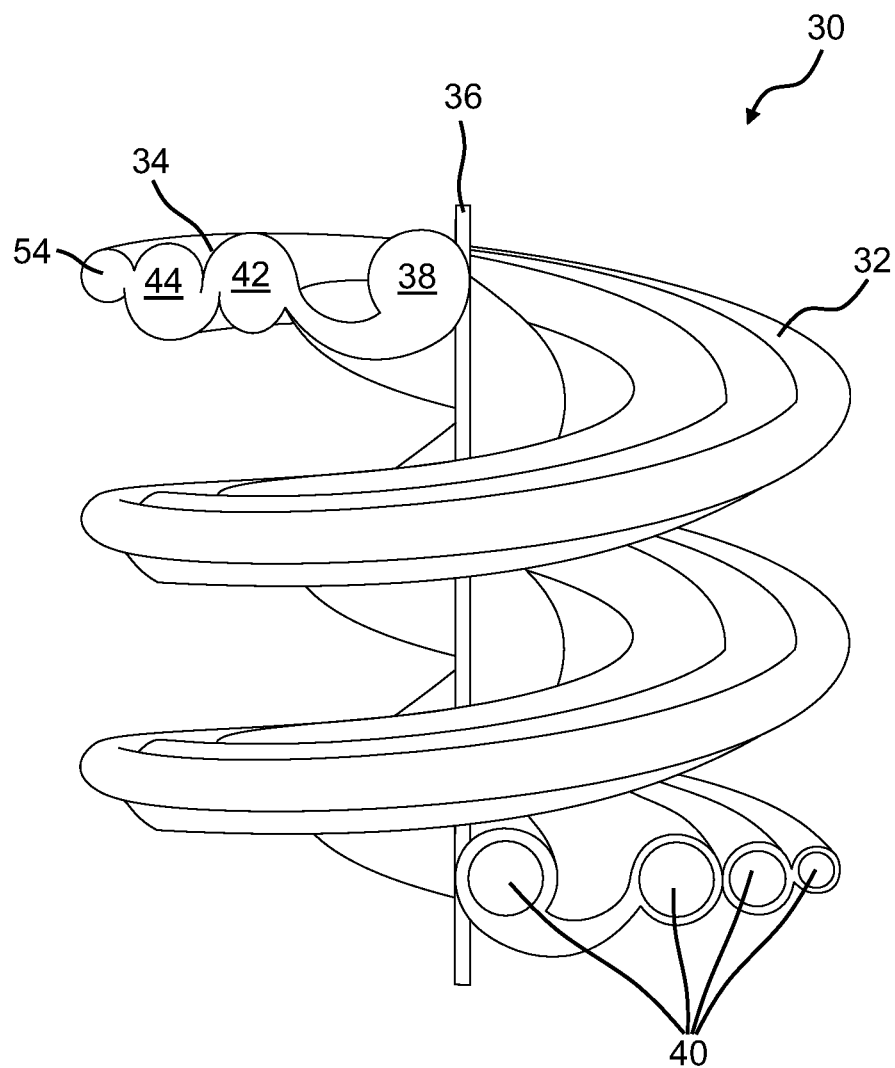
FIG. 3 is a further side on perspective view of the apparatus of FIG. 2, wherein the portion of the conduit of the apparatus intersected by the plane labelled 28 in FIG. 2 is shown in cross section.

Referring to FIGS. 2 and 3, an example embodiment of the present invention provides an improved apparatus 30 for separating particles from a particulate suspension. The apparatus 30 comprises a conduit 32 that comprises a plurality of elongate channels 34 that extend in adjacent alignment along a spiral path at different curvature radii from an axis 36 of the spiral path. Longitudinal sidewalls of the elongate channels 34 are fluidly joined together to allow for transfer of fluid between the elongate channels 34. The apparatus 30 also comprises an inlet 38 for directing a particulate suspension into the conduit 32 under pressure and along the spiral path and a plurality of outlets 40 configured to direct fluid from the particulate suspension out from a plurality of different discharge positions on the conduit 32.

Figure 4:
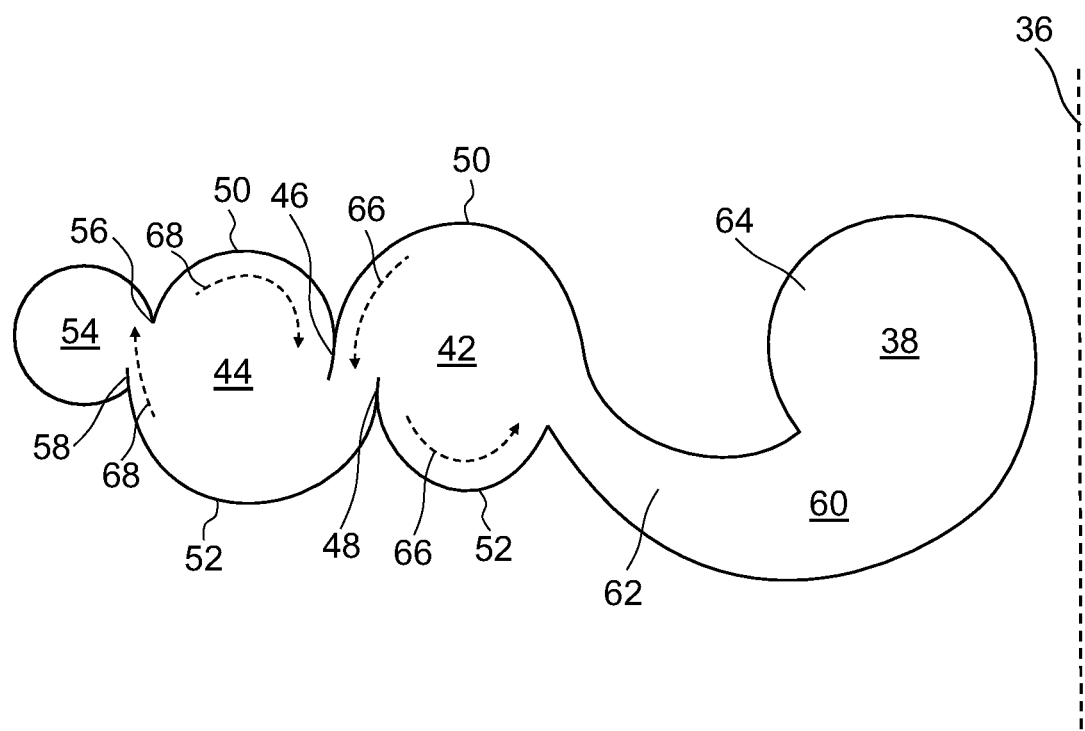
FIG. 4 is a line drawing showing a cross sectional shape of the conduit of the apparatus of FIG. 2.

As illustrated in FIG. 4, at least first and second of the elongate channels 42, 44 are approximately circular in cross section and comprise a shared longitudinal sidewall. The shared longitudinal sidewall comprises opposed uppermost and lowermost sidewall sections 46, 48 that are laterally offset from one another relative to the axis 36 of the spiral path. The offset arrangement of the sidewall sections 46, 48 allows for transfer of helically flowing fluid between the first and second elongate channels 42, 44.

More particularly, the first and second elongate channels 42, 44 may comprise uppermost and lowermost portions 50, 52 that are approximately semicircular in cross section. A pair of ends of the uppermost portions 50 may be joined together to provide the uppermost of the sidewall sections 46 and a pair of ends of the lowermost portions 52 may be joined together to provide the lowermost of the sidewall sections 48.

The conduit 32 may comprise a third elongate channel 54 that is adjacent to, and disposed outwardly from, the second channel 44. The third channel 54 may be approximately circular in cross section and comprise a longitudinal sidewall shared with the second channel 44. The longitudinal sidewall may also comprise uppermost and lowermost sidewall sections 56, 58 that are laterally offset from one another relative to the axis 36 of the spiral path. The sidewall sections 56, 58 may be offset such that fluid helically flowing from the second channel 44 into the third channel 54 flows in an opposite direction to fluid helically flowing from the first channel 42 into the second channel 44.

The conduit 32 may also comprise an innermost elongate channel 60. A cross sectional shape of the innermost channel 60 may comprise a curved end section 62 that tapers towards an end region fluidly joined to the first channel 42. The innermost channel 60 may also comprise an approximately circular section 64 that is fluidly joined to the curved end section 62.

The conduit 32 may be supported by an elongate support member that is vertically oriented and coaxial with the axis 36 of the spiral path followed by the conduit 32. The inlet 38 of the conduit 32 may be disposed proximal to an upper end of the apparatus 30 and the outlets 40 may be disposed proximal to a lower end of the apparatus 30. Preferably, the conduit 32 extends around the support member 36 by more than one complete rotation. In the example depicted, the conduit 32 extends around the support member 36 by at least two complete rotations.

The cross sectional shape of the innermost channel 60 may resemble a comma that has been rotated clockwise by ninety degrees, wherein the approximately circular section 64 is disposed towards the support member 36 and the curved end section 62 is spaced away from the support member 36. The uppermost and lowermost walls of the curved end section 62 may be tapered such that the height of the end section 62 reduces towards its peripheral end that joins the first channel 42.

The first circular channel 42 may be disposed outwardly from, and immediately above, the innermost channel 60. The inlet 38 may comprise an aperture formed in the conduit 32 that is arranged such that a fluid suspension entering the conduit 32 is initially directed into the circular section 64 of the innermost channel 60. The outlets 40 may comprise four apertures that are disposed at respective terminal ends of the four channels 60, 42, 44, 54. In such examples, the apertures 40 are arranged such that fluid discharge exits the conduit 32 from four different positions, the positions being located at different perpendicular distances away from the axis 36 of the conduit 32. In other examples, the outlets 40 may comprise four tapered nozzles (not shown) that discharge fluid out from the four channels. The nozzles may be disposed at the terminal ends of the channels or they may be connected to the conduit 32 at other positions.

In use, a fluid suspension may be directed into the inlet 38 under pressure using a pump (not shown). For example, a slurry may be pumped into the inlet 38 that comprises water with suspended mineral deposits consisting of various different sized particles. The fluid suspension enters the conduit 32 tangentially to the vertical axis 36 and initially flows through the innermost channel 60 towards the outlet apertures 40. As the fluid suspension moves along the spiral path taken by the innermost channel 60, a centrifugal field is created causing fluid and suspended particulates to be outwardly forced away from the axis 36. Particulates that are too small in size and/or weight to overcome the viscosity of the fluid remain flowing in the innermost channel 60. Larger and/or heavier particulates move outwardly and along the tapered portion 62 until they are forced up into the first approximately circular channel 42. The curvature of the channel 42 inherently causes the fluid to flow therethrough helically in an anticlockwise rotational direction, as indicated by the pair of arrows labelled 66 in FIG. 4.

The uppermost and lowermost sidewall sections 46, 48 at the boundary between the first and second circular channels 42, 44 are offset from one another with respect to the vertical. The helically flowing fluid in the first circular conduit 42 is, therefore, able to flow downwardly through the gap formed between the two sidewall sections 46, 48. The fluid advantageously flows into the second circular channel 44 effectively with negligible fluid friction and turbulence. Within the first circular channel 42, particulates that are too small in size and/or weight to overcome the viscosity of the fluid remain flowing in the channel 42, whereas larger and/or heavier particulates are forced outwardly into the second conduit 44.

The fluid flows helically through the second conduit 44 in a clockwise rotational direction, as indicated by the pair of arrows labelled 68. Because the uppermost and lowermost sidewall sections 56, 58 at the boundary between the second and third circular channels 44, 54 are also offset from one another with respect to the vertical, the helically flowing fluid may flow upwardly through the gap formed between the two sidewall sections 56, 58. Within the second circular channel 44, particulates that are too small in size and/or weight to overcome the viscosity of the fluid remain flowing in the channel 44, whereas larger and/or heavier particulates are forced outwardly into the third channel 54.

By the time the fluid has flowed all the way to the lowermost end of the conduit 32, the various particulates are fully separated such that the four channels 60, 42, 44, 54 contain particles that have been separated into, respectively, four different classes. The smallest/lightest particles are contained in the innermost channel 60 and the largest/heaviest particles are contained in the outermost channel 54. The four different sets of separated particulates exit the conduit 32 in fluid suspension via the four apertures 40.

The apparatus 30 is advantageously simple in structure, compact in size and achieves highly efficient particle grading with no moving parts. The problematic short circuit flow that is encountered when using cyclone separators is also eliminated. The offset arrangement of the sidewall sections 46, 48, 56, 58 advantageously enables the fluid to flow through, and to transfer laterally between, the three circular channels 42, 44, 54 in a naturally helical manner and with negligible fluid resistance. This avoids the problematic turbulent flow that occurs in the prior apparatus depicted in FIG. 1 and provides for a three-stage continuous separation process which greatly enhances the particle separation efficiency. Fluid travelling through the conduit 32 flows laterally from the innermost channel 60 out towards the outermost channel 54 via the intermediate channels 42, 44 in a smooth and unimpeded helical manner in alternating anti-clockwise 66 and clockwise 68 rotational directions.

The conduit 30 design is also advantageously scalable and allows particles to be separated and graded into a high number of classes if required. To increase the number of classes, additional elongate channels may simply be added to the outermost side of the conduit 32 to accommodate the additional classes. The additional channels may be similar in design to the three circular channels 42, 44, 54 depicted in the example in order to maintain the alternating anticlockwise/clockwise pattern of the fluid flowing helically through the channels.

Embodiments of the present invention provide systems and methods that are useful for separating particulate materials from slurries and other particulate suspensions.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. An apparatus for separating particles from a particulate suspension, comprising:
   a conduit that comprises a plurality of elongate channels that extend in adjacent alignment along a spiral path at different curvature radii from an axis of the spiral path, wherein longitudinal sidewalls of the elongate channels are fluidly joined together to allow for transfer of fluid between the elongate channels;
   an inlet for directing a particulate suspension into the conduit under pressure and along the spiral path; and
   a plurality of outlets configured to direct fluid from the particulate suspension out from a plurality of different discharge positions on the conduit,
wherein at least first and second of the elongate channels are approximately circular in cross section, wherein at least one of the longitudinal sidewalls is shared by the first and second of the elongate channels and comprises opposed uppermost and lowermost sidewall sections that are laterally offset from one another relative to the axis of the spiral path to allow for transfer of helically flowing fluid between the first and second of the elongate channels.

2. The apparatus according to claim 1, wherein the first and second of the elongate channels comprise uppermost and lowermost portions that are approximately semicircular in cross section, wherein a pair of ends of the uppermost portions are joined together to provide the uppermost of the sidewall sections and a pair of ends of the lowermost portions are joined together to provide the lowermost of the sidewall sections.

3. The apparatus according to claim 1, wherein a third of the elongate channels is approximately circular in cross section, wherein at least another one of the longitudinal sidewalls is shared by the third and second of the elongate channels and is configured such that fluid helically flowing from the second of the elongate channels into the third of the elongate channels flows in an opposite direction to fluid helically flowing from the first of the elongate channels into the second of the elongate channels.

4. The apparatus according to claim 1, wherein the conduit also comprises an innermost elongate channel, wherein a cross sectional shape of the innermost elongate channel comprises a curved end section that tapers towards an end region fluidly joined to the first of the elongate channels.

5. The apparatus according to claim 4, wherein the cross sectional shape of the innermost elongate channel also comprises an approximately circular section that is fluidly joined to the curved end section.

6. The apparatus according to claim 5, wherein the inlet directs the particulate suspension into the approximately circular section.

7. The apparatus according to claim 1, wherein the outlets are arranged such that the discharge positions are different distances away from the axis of the spiral path.

8. The apparatus according to claim 7, wherein each of the outlets is configured to direct fluid from the particulate suspension out from a unique one of the elongate channels.

9. The apparatus according to claim 8, wherein the outlets comprise a plurality of apertures in the conduit proximal to terminal ends of the elongate channels.

10. The apparatus according to claim 8, wherein the outlets comprise a plurality of nozzles on the conduit proximal to terminal ends of the elongate channels.

11. The apparatus according to claim 10, wherein the nozzles are tapered.

12. The apparatus according to claim 1, wherein the axis of the helical path is generally vertically oriented and the outlets are arranged such that the discharge positions are different perpendicular distances away from the axis of the helical path.

13. The apparatus according to claim 12, wherein the conduit is supported by a vertically orientated support member.

14. The apparatus according to claim 1, wherein the conduit extends around the axis of the spiral path by more than one complete rotation.

15. The apparatus according to claim 1, wherein the apparatus comprises a pump for pumping the particulate suspension into the inlet.

* * * * *